Patented Dec. 29, 1925.

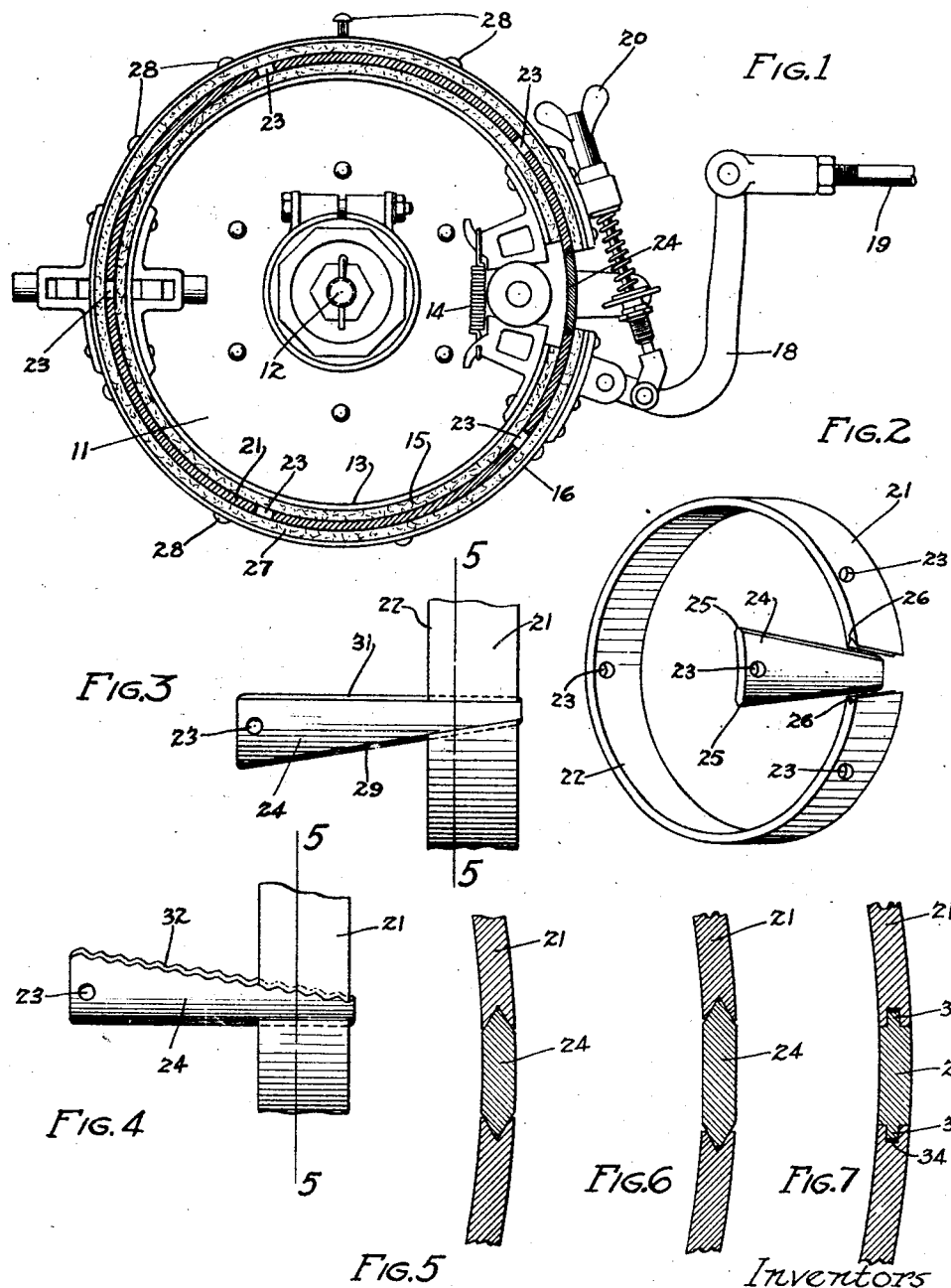

1,567,713

UNITED STATES PATENT OFFICE.

JOHN CORSER AND PETER C. OLSON, OF MINNEAPOLIS, MINNESOTA; SAID OLSON ASSIGNOR TO SAID CORSER.

APPARATUS FOR RELINING MOTOR-VEHICLE BRAKE BANDS.

Application filed July 10, 1922. Serial No. 574,006.

*To all whom it may concern:*

Be it known that we, JOHN CORSER and PETER C. OLSON, citizens of the United States, residing at Minneapolis, county of Hennepin, in the State of Minnesota, have invented certain new and useful Improvements in Apparatus for Relining Motor-Vehicle Brake Bands, of which the following is a specification.

This invention relates to improvements in apparatus for re-lining motor vehicle brake-bands. This new apparatus is adapted particularly for use in connection with the employment of the process of re-lining such brake-bands which consists in removing a wheel, then removing the old lining from the brake-band while the brake-band remains substantially in its normal position in the vehicle, then placing a new lining in the desired relationship to the band, then driving fastenings through the band and lining to secure them together while the band still remains substantially in its position, and holding an apparatus in the proper position to clinch said fastenings as they are driven. It is such an apparatus as that last-mentioned which forms the sub-ject-matter of the novel invention. This present invention therefore, more particularly relates to the apparatus used to clinch the fastenings such as rivets as they are driven through the usual brake-band apertures and new lining.

The object therefore of this invention is to provide a new and improved apparatus for re-lining motor-vehicle brake-bands.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow:

In the drawings:

Figure 1 is a view in side elevation of a common form of internal and external brake-mechanism after removal of a rear wheel and drum, the novel ring or anvil being here shown in section and in operative position.

Figure 2 is a perspective view of the anvil and preferred form of expansion member;

Figure 3 is a view in front elevation of a portion of an anvil and a modified form of co-operable expansion member;

Figure 4 is a view similar to that of Figure 3 but with another modified form of expansion member;

Figure 5 is a cross-sectional view of the expansion member and adjacent anvil portions on the line 5—5 of either Figures 3 or 4;

Figure 6 is a similar cross-sectional view but showing another modification of the expansion member;

Figure 7 shows another modified form of expansion member in cross-section.

In the accompanying drawings, there is illustrated a common form of brake mechanism which mechanism is shown with the rear wheel and its brake drum removed. The annular plate 11 is fixed to the rear axle housing as is usual and is stationary with respect thereto. The axle 12 for a rear wheel projects therethrough in accordance with standard practice. The mounting of the emergency internal expanding brake-band 13 and its connection 14 with an emergency brake-rod (not shown) is old so far as the inventors hereof are concerned. The brake-band 13, as is usual, is provided with a lining 15 adapted to be frictionally held against the internal face of the usual brake-drum (not necessary to be shown). Likewise, it is old in this art to provide a service external contracting brake-band 16 having a lining suitably mounted and having a connection 18 with the usual service or foot brake rod 19.

The novel anvil apparatus here disclosed comprises an anvil proper and a complementary expansion member. The anvil 21 consists preferably of an arcuately shaped strip of metal which is relatively rigid yet has some resiliency. This anvil is desirably somewhat greater in width than the width of the brake-band with which it is adapted to be used. Thus, when the anvil is operatively positioned, as is shown in Figure 1, a circumferential portion 22 (see Figure 2) projects outwardly beyond the side edges of the brake-bands and their linings. This projecting portion 22 of the anvil is preferably provided with holes 23 therethrough, These holes are disposed adjacent the edge of such portion 22 and are provided for reception of an instrument such as a rod, pin, etc., whereby the anvil may be easily manipulated. Any convenient number of such holes 23 may be provided, for example, three such holes are shown in Figure 2 while five are suggested in Fig. 1.

The complementary expansion member is adapted to expand the anvil so that the anvil may be closely held against the new positioned brake-lining. This expansion member functions to expand the anvil upon emplacement between the two ends of the anvil and subsequent inward driving of this member. Anvil expansion results from the tapered form of one or both edges of the member or of one or both ends of the anvil while the co-operatively contacting edges of the anvil and expansion member may be flat, it is preferred to provide a guiding or interlocking means.

The preferred form of expansion member and its operative assembly with an anvil are shown in Figures 1 and 2. This form comprises a wedge-like member 24 formed of substantially stiff metal. The member is substantially arcuate in transverse section and both of its longitudinal edges are substantially outwardly V-shaped to provide guiding or interlocking opposed shoulders 25 adapted slidably to be received within the similarly shaped recesses or grooves 26 presented by the ends of the anvil 21. Likewise, in this preferred form, the two ends of the anvil are tapered or convergent. This member 24 may also be provided with a hole 23 for the insertion of a manipulating instrument.

The use of this anvil and expansion member may be pointed out in connection with the re-lining of an external brake-band. Initially, the rear wheel and attached brake-drum are removed in the usual manner but the brake-band connections need not be demounted. Instead the old rivets which secure the old lining to the brake-band are cut away, usually by a chisel and hammer, whereupon the old lining is then removed from the brake-band. A new lining 27 of the correct width and length, as measured by the old, is then put in the place of the old lining inside the brake-band 16 as indicated in Figure 1. The anvil 21 is then inserted in the position normally occupied by the usual brake-drum, that is, inside the new lining 27 as is also shown in Figure 1. The brake-band adjustment is preferably loosened previously to increase the effective diameter of the brake-band. This may be conveniently effected by rotating the adjusting wing nut 20. After insertion of the new lining and the anvil, the brake-band adjustment may be restored to its former position. The expansion member is then employed to expand the anvil and to hold the new lining tightly to its brake-band. The opposed edges of the expansion member or wedge are inserted in the opposed terminal grooves 26 of the anvil with the narrower portion of the wedge leading so that the wedge with its outward taper may be inwardly driven and the anvil expanded. With the apparatus in such position, new rivets 28 are then inserted in the usual holes provided in the external brake-band and are inwardly driven through the new lining 27 and, striking against the anvil 21, are bent or deflected tightly to grip or clinch the new lining and thus to secure it to the external brake-band. Preferably, brass rivets 28 of the split type shown in Figure 1 are employed. Removal of the wedge after completion of the riveting permits the resilient contraction of the anvil and thus facilitate its removal.

In the form shown in Figure 3, the longitudinal V-shaped edges of the wedge are not both tapered, instead one edge 29 is tapered and the other edge 31 is straight while one complementary end face of the anvil is correspondingly straight and the other tapered.

In the modification illustrated in Figure 4, the edges of the wedge are substantially similar to those shown in Figure 3 with the exception that the tapered edge 32 is serrated to correspond with the complementary serrated end face of the anvil.

In the preferred form shown in Figures 1 and 2, as well as in the modification shown in Figures 3, 4, and 5, the wedges are arcuate in cross-section. In the modified form shown in Figure 6, the wedge is shown as straight in cross-section, while in Figure 7, the wedge is shown again as arcuate in cross-section but differs in that its longitudinal working edges are shaped to provide a median shoulder or tongue 33 each adapted to be slidably received within a recess or groove 34 in the ends of the anvil.

While the anvil is shown in such position that the wedge is inwardly driven at the space between the ends of the usual brake-band, it is to be understood that such positioning is not necessary.

By the employment of this novel anvil and wedge, the anvil is more firmly held in operative position while the new lining is likewise securely and accurately held for the riveting steps.

Having thus described our invention what we claim as new and desire to secure by Letters Patent is:

1. An apparatus for relining motor vehicle brake-bands comprising a substantially annular split anvil, the anvil having a portion of greater width than the brake band to be relined whereby a portion of the anvil may project beyond the brake band when the anvil is in operative position, and a wedge adapted to be positioned in the split anvil to expand it, said projecting anvil portion and said wedge each formed to receive means to facilitate handling the anvil and withdrawal of the wedge.

2. An apparatus for relining motor vehicle brake bands comprising a substantially annular split anvil, the anvil having a portion of greater width than the brake band to be relined whereby a portion of the anvil may project beyond the brake band when the anvil is in operative position, said projecting anvil portion being provided with an aperture, a wedge adapted to be positioned in the split anvil to expand it and having an inclined working edge in serrated form to cooperate with corresponding serrations on the edge of the split portion of the anvil, said wedge having an aperture therein, and means adapted to be inserted in the aperture in said anvil to facilitate its handling and in said wedge to facilitate its withdrawal.

In witness whereof, we have hereunto set our hands this 29th day of June, 1922.

JOHN CORSER.
PETER C. OLSON.